(12) United States Patent
Touma et al.

(10) Patent No.: US 6,288,809 B1
(45) Date of Patent: Sep. 11, 2001

(54) OPTICAL SUBSCRIBER NETWORK SYSTEM

(75) Inventors: Eisaku Touma; Takashi Sakata, both of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/020,940

(22) Filed: Feb. 9, 1998

(30) Foreign Application Priority Data

Oct. 20, 1997 (JP) .................................................. 9-286937

(51) Int. Cl.[7] .............................. H04B 10/08; H04J 14/02
(52) U.S. Cl. ........................................... 359/125; 359/110
(58) Field of Search .................................. 359/110, 125, 359/161

(56) References Cited

U.S. PATENT DOCUMENTS

| | | | |
|---|---|---|---|
| 5,539,564 | * 7/1996 | Kumozaki et al. | 359/161 |
| 5,646,758 | * 7/1997 | Miki et al. | 359/137 |
| 5,715,074 | * 2/1998 | Netsu | 359/110 |
| 5,872,644 | * 2/1999 | Yamazaki et al. | 359/121 |
| 5,949,563 | * 7/1999 | Takada | 359/124 |

* cited by examiner

*Primary Examiner*—Leslie Pascal
*Assistant Examiner*—Dalzid Singh
(74) *Attorney, Agent, or Firm*—Helfgott & Karas, P C

(57) ABSTRACT

In an optical subscriber network system which connects plural optical network units to an optical service unit using passive optical elements through an optical transmission line, the optical transmission line is duplexed with a lower cost. The optical service unit and the optical network units each have plural transmission-reception portions the wavelengths of which are different from each other, and the inputs and outputs of the plural transmission-reception portions are multiplexed with the wavelengths (WDM) into a single optical transmission line to form a pseudo redundant communication path between the optical service unit and the optical network units. The communication which uses a certain wavelength between the optical service unit and the optical network units is active, and the communication which uses another wavelength is a standby. When the active communication has a fault, a switchover operation to the standby communication is performed. The communication path using plural wavelengths between the optical service unit and the optical network units can select either the function of "with redundancy" or "without redundancy" or "enhanced line speed", depending on subscribers' demands.

12 Claims, 14 Drawing Sheets

F I G. 2

|  |  | SELECTED RECEIVER IN OSU | SELECTED RECEIVER IN ONU |
|---|---|---|---|
| (1) NORMAL | | SYSTEM0 (1.3μm) | SYSTEM0 |
| FAULTS IN ONU (SYSTEM0) | (2) TRANSMITTER FAULTS | SYSTEM1 (1.5μm) | SYSTEM0 |
| | (3) RECEIVER FAULTS | SYSTEM1 | SYSTEM1 |
| | (4) TRANSMITTER/ RECEIVER FAULTS | SYSTEM1 | SYSTEM1 |
| FAULTS IN OSU (SYSTEM0) | (5) TRANSMITTER FAULTS | SYSTEM1 | SYSTEM1 |
| | (6) RECEIVER FAULTS | SYSTEM1 | SYSTEM0 |
| | (7) TRANSMITTER/ RECEIVER FAULTS | SYSTEM1 | SYSTEM1 |

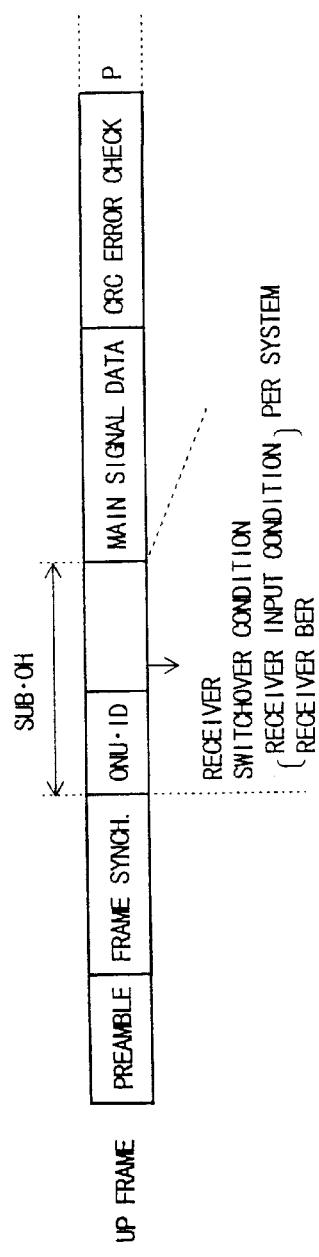
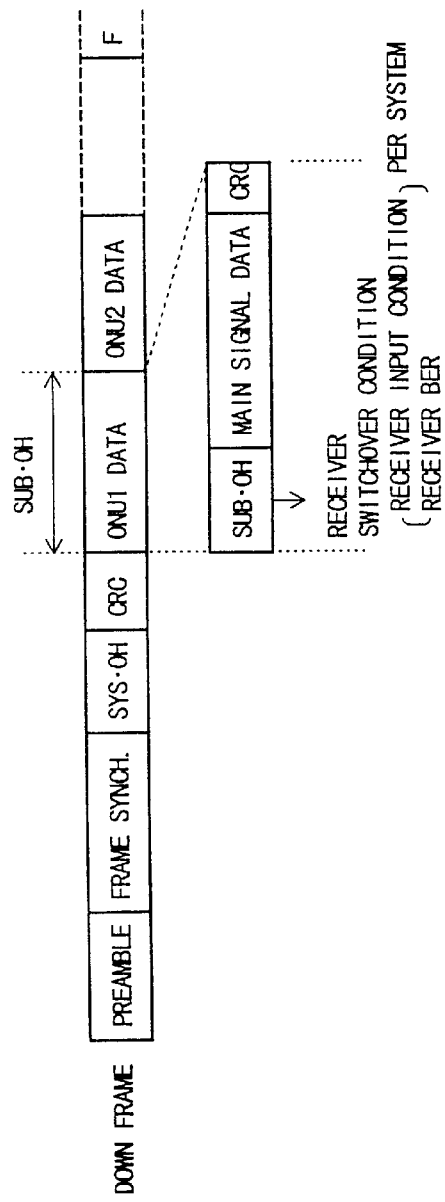

F I G. 6

|  |  | 1.3 μm SIGNAL | 1.5 μm SIGNAL |
|---|---|---|---|
| ONU1 WITHOUT REDUNDANCY | | ACTIVE (NO SWITCHOVER SYSTEM) | NON-ACTIVE |
| ONU2 WITH REDUNDANCY (SAME ARRANGEMENT AS EMBODIMENT (1)) | | ACTIVE FOR SYSTEM0 | ACTIVE FOR SYSTEM1 |
| ONU3 WITH REDUNDANCY & SELECTABLE ENHANCED LINE SPEED | REDUNDANT MODE | ACTIVE FOR SYSTEM0 | ACTIVE FOR SYSTEM1 |
| | ENHANCED LINE SPEED MODE | USING A SINGLE LINE BUNDLED WITH MAIN SIGNAL DATA IN OPTICAL SIGNALS IN DUPLEXED SYSTEMS (1.3 μm+1.5 μm) | |

F I G. 7

|  | TYPE OF CONNECTED OSU | OPERATING MODE IN SELECTABLE UNIT | ACTIVE RECEIVER IN OSU |
|---|---|---|---|
| ONU1 | WITHOUT REDUNDANCY | — | — |
| ONU2 | WITH REDUNDANCY | — | SYSTEM0 |
| ONU3 | REDUNDANT SYSTEM /ENHANCED LINE SPEED | REDUNDANT SYSTEM IS SELECTED | SYSTEM1 |
| ONU4 | REDUNDANT SYSTEM /ENHANCED LINE SPEED | ENHANCED LINE SPEED IS SELECTED | — |
| ⋮ | ⋮ | ⋮ | ⋮ |
| ONUn | WITH REDUNDANCY | — | SYSTEM0 |

OPTICAL SUBSCRIBER NETWORK SYSTEM

BACKGROUND OF THE INVENTION

1. Field of the Invention

The present invention relates to a light or optical subscriber network system, and in particular to an optical subscriber network system which is formed of a passive optical network.

2. Description of the Related Art

To subscribers requiring a high-speed and large capacity of communication, as shown in FIG. 12, has generally known a network system which accommodates optical subscribers #1–#n with optical network units generally designated by ONU through optical fibers generally designated by OF correspondingly constructed from an optical service unit (station unit) OSU in a station ST which is formed of the optical service unit OSU and a switchboard EX.

On the other hand, in recent years, a passive optical subscriber network system as shown in FIG. 13 has been put into practice which accommodates optical subscribers which need a broad-band communication.

This passive optical subscriber network system has an optical star coupler SC which consists of passive elements between a station unit and the optical network units (subscriber units). A pair or two pairs for redundancy of optical fibers OF1 are provided between the station ST and the star coupler SC. Optical fibers OF2, which are exclusive for each subscriber, are provided from the star coupler SC to the subscribers #1–#n.

In the star coupler SC, a down optical signal is distributed from the station ST to the respective optical subscribers #1–#n while up optical signals are united from the optical subscribers #1–#n to the station ST.

In such an optical subscriber network system as mentioned above, TCM (Time Compression Multiplexing) method has been used which adopts TDMA (Time Division Multiple Access) method enabling subscribers to access the station unit by allotting time slots to the up signal from the optical network unit ONU to the optical service unit OSU and TDM (Time Division Multiplexing) method used in the down signal from the optical service unit OSU to the optical network unit ONU when the outputs of the plural optical network units ONU are multiplexed to a single optical transmission line (optical fiber).

That is, as shown in FIG. 14, the down signal frame from the optical service unit OSU is provided for the optical subscribers e.g. #1 and #2 by the TDM method, and the up signal frame from the subscribers #1 and #2 to the optical service unit OSU is provided by the TDMA method.

In this TCM method, the construction cost of the system can be reduced by sharing both the optical transmission line and the optical service unit of the station, in comparison with the method of connecting the optical service unit OSU and the optical network unit ONU correspondingly. Moreover, the reliability of the system can be improved because passive elements are used for a star coupler, compared with the method of multiplexing/demultiplexing optical signals with an active unit.

In the passive optical subscriber network system shown in FIG. 13, it is considerably easy to form duplexed optical transmission lines for redundancy from the station to the star coupler.

However, the formation from the star coupler to the subscribers is not duplexed. Therefore, if a fault occurs in the optical transmission-reception portion (transceiver system) of the optical network unit ONU, the communication between the station and the faulted optical network unit ONU will be completely broken.

In the worst case, as shown in FIGS. 15 and 16, the optical transmission portion of the faulted optical network unit ONU2 emits light abnormally at the time slot TS' which is not the same as the time slot TS (shown by a dotted line) in which light should be emitted. The abnormal light emission may collide with the up frame in the optical network unit ONU1 which is accommodated in the same star coupler. Eventually the communication can be obstructed and interrupted.

Moreover, the maintenance in the station is relatively easy while it is difficult to specify whether the faulted point resides in the transmission line or in the optical network unit because information of the optical network unit is not obtained at the side upon the fault. Therefore, fieldworks increase so that restoration time, material and human costs grow to remove the fault of the optical network unit.

As measures for these problems, another optical network system has been considered as shown in FIG. 17. This system is formed of a star coupler SC, an optical fiber OF2, and an optical transmission-reception portion of an optical network unit ONU which are respectively duplexed. This system must follow a great cost increase.

SUMMARY OF THE INVENTION

It is accordingly an object of the present invention to provide an optical subscriber network system which connects plural optical network units (subscriber units) to an optical service unit (station unit) through optical transmission lines with passive optical elements, in which the optical transmission system is duplexed with a lower cost.

In order to achieve the above-mentioned object, an optical subscriber network system according to the present invention is characterized in that the optical service unit and the optical network units each comprise a plurality of transmission-reception portions which transmit and receive signals the wavelengths of which are different from each other, an optical coupler installed between the transmission-reception portions and the optical transmission line, a system changer which switches over the transmission-reception portions and receives a main signal of one system, and a controller which monitors the reception state detected at the transmission-reception portions, and switches over the system changer to the system without a fault which the controller detects from the reception state.

Namely, in the present invention, the optical service unit and the optical network unit have transmission-reception portions of more than two systems with different wavelengths. The inputs and outputs of the transmission-reception portions are multiplexed with wavelengths into a single optical transmission line to form a pseudo redundant communication path between the optical service unit and the optical network units.

Furthermore, two kinds of communication systems are provided. One is an active system between the optical service unit and the optical network units with a certain wavelength while the other with a different wavelength is a standby system. When the active system has a fault, a switchover is made to the standby system, thereby improving faultiness between the optical service unit and the optical network units.

The above-mentioned system changer may separate the main signal into both of the transmission-reception portions.

The above-mentioned controller may drop or add a frame signal which has the subscriber overhead indicating the reception state, from the transmission-reception portions.

Namely, the information of communication state such as optical input, bit error rate (BER) between the optical service unit and the optical network units with respect to each wavelength and the system changer is transmitted from the optical network units to the optical service unit through the overhead. The optical service unit collects the communication states of the active system as well as the standby system with that information for a maintenance person. The maintenance person can find a fault of the standby system earlier, and specify the fault point, from that information.

Also, in the optical subscriber network system according to the present invention, the optical service unit and the optical network units each comprise plural combinations of; a plurality of transmission-reception portions which transmit and receive signals the wavelengths of which are different from each other, an optical coupler installed between the transmission-reception portions and the optical transmission line, and a system changer/multiplexing/demultiplexing portion which switches over the transmission-reception portions and receives a main signal of one system. There are further provided a multiplexing/demultiplexing portion connected to the system changer/multiplexing/demultiplexing portion to output the main signal, and a controller which monitors the reception state detected at the transmission-reception portions, and switches over the system changer/multiplexing/demultiplexing portion to a system without faults which the controller detects from the reception state. The controller controls the system changer/multiplexing/demultiplexing portion to form either a system with redundancy or a system with enhanced line speed (rate). Each optical network unit selects any of the system without redundancy, the system with only redundancy, or the system with redundancy and enhanced line speed.

Namely, communication paths between the optical network units and the optical service unit using plural optical wavelengths can be used to increase the transmission capacity, but not for a system with redundancy, depending on the transmission reliability between the optical service unit and the optical network units demanded by the optical network units, enabling a flexible subscriber transmission system to be formed by the subscribers' demands. Of course, optical network units without redundancy per se are applicable.

The above-mentioned system changer/multiplexing/demultiplexing portion may separate the main signal into both of the transmission-reception portions.

Also, the above-mentioned controller may drop or add a frame signal with a subscriber overhead indicating the reception state from the transmission-reception portion, and has time slot information allocated to each optical network unit for controlling the system changer/multiplexing/demultiplexing portion according to the arrangement of each optical network unit.

Also, each transmission-reception portion may be composed of a multiplexing/demultiplexing portion which multiplexes and demultiplexes an electrical signal, and a photoelectric converter connected to the multiplexing/demultiplexing portion to make conversions between an optical signal and an electrical signal.

Furthermore, the above-mentioned optical coupler may comprise an optical wavelength selecting coupler (OWSC) which synthesizes a transmission signal of the transmission-reception portion and separates a reception signal from the optical transmission line to both of the transmission-reception portions.

BRIEF DESCRIPTION OF THE DRAWINGS

FIG. 2 is a chart showing a switchover example of the receiving system of an optical service unit and an optical network unit (for one subscriber) in the embodiment (1) of the optical subscriber network system according to the present invention;

FIG. 4 is a format diagram of a signal frame between the optical service unit and the optical network unit used in the embodiment of the optical subscriber network system according to the present invention;

FIG. 6 is a diagram showing a redundant arrangement of the optical network unit used in the embodiment (2) of the optical subscriber network system according to the present invention;

FIG. 7 is a chart showing a subscriber information accommodated in the optical service unit used in the embodiment (2) of the optical subscriber network system according to the present invention;

Throughout the figures, like reference numerals indicate like or corresponding components.

DESCRIPTION OF THE EMBODIMENTS

Figure 1:
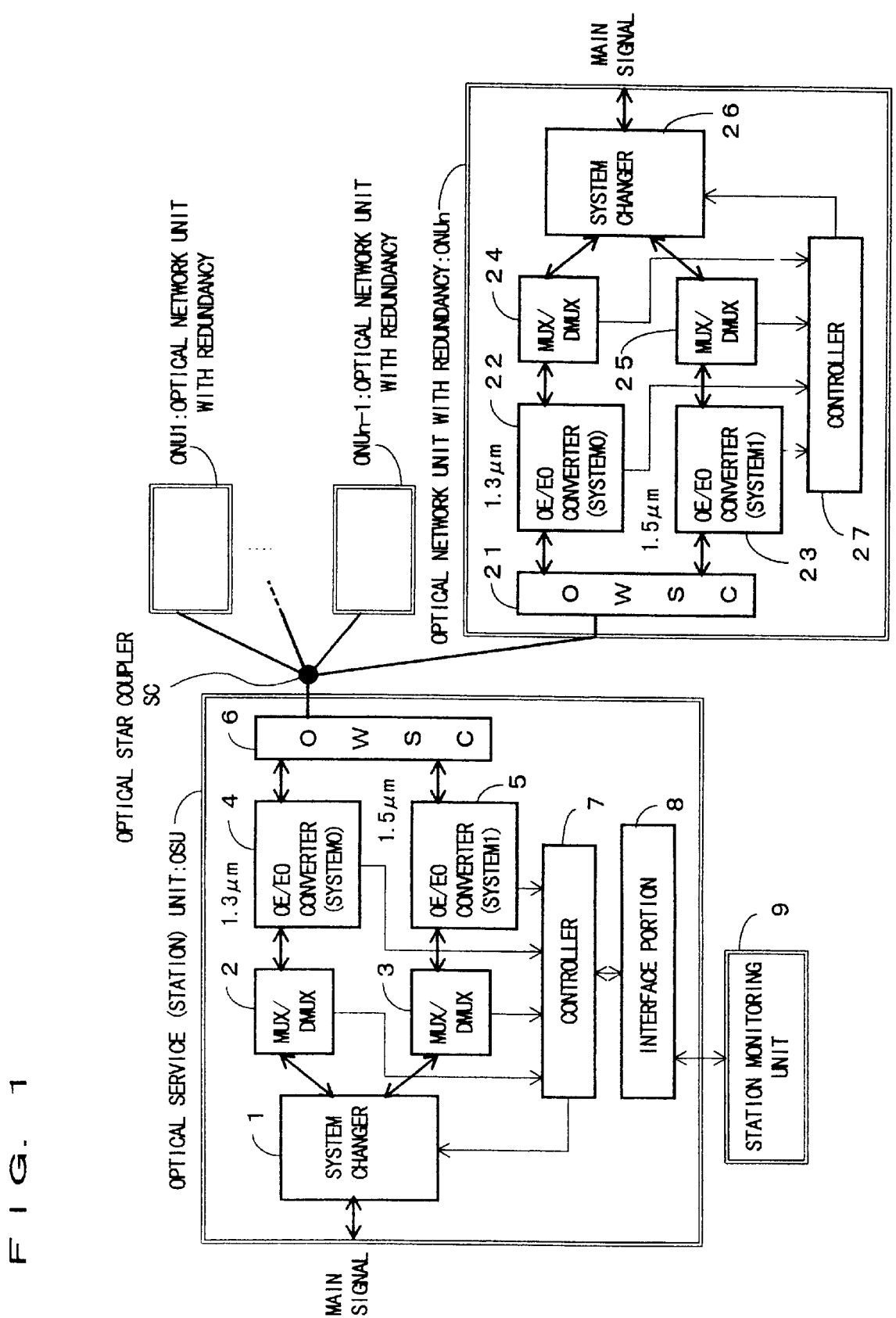
FIG. 1 is a block diagram showing an embodiment (1) of an optical subscriber network system according to the present invention.

FIG. 1 shows an embodiment (1) of an optical subscriber network system according to the present invention. An optical service unit (station unit) OSU and optical network units (subscriber units) ONU1–ONUn have respectively duplexed (dual) optical transmission systems which communicate between the station-the subscribers by TDMA/TCM multiplexing method with the optical wavelengths of 1.3 $\mu$m (system0) and 1.5 $\mu$m (system1).

Namely, the optical service unit OSU is composed of a system changer 1, a multiplexing/demultiplexing (MUX/DMUX) portion 2 of the system0, a multiplexing/demultiplexing portion 3 of the system1, photoelectric (OE/EO) converters 4, 5 of the system0, an optical wavelength selecting coupler 6, a controller 7, and an interface portion 8. The system changer 1 separates an electrical main signal into the system1 and system2. The multiplexing/demultiplexing portion 2 of the system0 and the multiplexing/demultiplexing portion 3 of the system1 multiplex a main signal from the system changer 1 and demultiplex the main signal to the system changer 1. The photoelectric converters 4, 5 of the system0 are connected to the multiplexing/demultiplexing portions 2, 3 respectively to convert electrical signals from the multiplexing/demultiplexing portions 2, 3 into optical signals and to convert optical signals from the subscribers into electrical signals which are sent to the multiplexing/demultiplexing portions 2, 3. The optical wavelength selecting coupler 6 is connected to the photoelectric converters 4, 5 to select either of the optical wavelengths of the converters 4, 5. The controller 7 inputs control signals demultiplexed at the multiplexing/demultiplexing portions 2, 3 and control signals detected by the photoelectric converters 4, 5 to output the control signals for switching over the system changer 1. The interface portion 8 interfaces the controller 7, and an external station monitoring unit 9.

The optical service unit OSU and optical network units ONU1–ONUn connected to the optical service unit through the optical star coupler SC are respectively composed of an optical wavelength selecting coupler (OWSC) 21 which is connected to the optical star coupler SC; a photoelectric converter 22 of the system0 and a photoelectric converter 23 of the system1 both of which are connected to the optical wavelength selecting coupler 21 multiplexing/demultiplexing portions 24, 25 which are connected to the photoelectric converters 22, 23; a system changer 26 connected to the multiplexing/demultiplexing portions 24, 25; and a controller 27 which receives control signals from the photoelectric converters 22, 23 and the multiplexing/demultiplexing portions 24, 25 to control the system changer 26. It is to be noted that the optical service unit OSU and the optical network units ONU have the same internal composition as shown in FIG. 1.

In either of the optical service unit OSU or the optical network unit ONU, both of the multiplexing/demultiplexing portions and the photoelectric converters form a transmission-reception portion. The operation of this embodiment (1) will now be described hereinafter.

In the optical service units OSU, the main down signal for the optical network units ONU1–ONUn is commonly given to the multiplexing/demultiplexing portions 2, 3 respectively of the system0/system1 from the system changer 1 and is added with a controlling overhead to form down signal frames to the subscribers.

These down signal frames are converted into down optical signals whose wavelengths are 1.3 μm (system0) and 1.5 μm (system1) respectively, by the photoelectric converters 4, 5. These down optical signals are coupled by the optical wavelength selecting coupler 6, and is put into the optical transmission line to the subscribers. The down signals of the system1 and system2 have the same contents as the main signal.

The down optical signals are transmitted to the optical wavelength selecting coupler 21 at the optical network units ONU1–ONUn through the optical star coupler SC. At the optical wavelength selecting coupler 21, the wavelengths of 1.3 μm (system0) and 1.5 μm (system1) are selected/demultiplexed, and are provided for the photoelectric converters 22, 23 respectively for the restoration of the corresponding electrical signals. Then, the multiplexing/demultiplexing portions 24, 25 drop the signal addressed to the own station from the down signal, and is provided for the controller 27 of the optical network units ONU1–ONUn.

The controller 27 monitors the input state of the down signals in the system0 and system1. When the down optical signal is interrupted, or the bit error rate of the down signal is worsened, the controller 27 changes over the main signal between the system0 and system1, and outputs it from the system changer 26.

For instance, when the optical input in the system0 which is active is interrupted, the system changer 26 receives a control signal from the controller 27 and switches over the receiving system from the system0 to system1 for the protection of the operating line.

On the other hand, the up signal from the optical network units ONU1–ONUn to the optical service unit OSU passes through the system changer 26 of the optical network units and is added at the multiplexing/demultiplexing portions 24, 25 with an overhead which has a communication state information of the system0 and system1 of the optical network units and a switchover information of the system to form an up signal burst-frame which is then converted to an up optical signal toward the optical service unit OSU by the photoelectric converters 22, 23.

The optical signals of the system0 and system1 are coupled by the optical wavelength selecting coupler 21 and put into the optical transmission line connected to the optical service unit OSU. As the up signals of the system0 and system1, the main signals of the same contents are transmitted like the down signal.

The optical signal transmitted to the optical service unit OSU through the optical star coupler SC is selected/demultiplexed per each wavelength at the optical wavelength selecting coupler 6 as the down signal is sent to the optical network units ONU1–ONUn. The optical signal is converted into an electrical signal by the photoelectric converters 4, 5 and demultiplexed by the multiplexing/demultiplexing portions 2, 3. The controller 7 monitors the up optical signal per each wavelength and each optical network unit. The controller 7 then controls the system changer 1 so as to select the main signal in the system0 or system1 per each optical network unit depending on whether the optical up signal is interrupted or the bit error rate of the up signal becomes worse. The main signal is output from the optical service unit OSU.

The information of system selection in the optical service unit and the optical network unit as well as the information of the transmission quality of the line (bit error rate) are transmitted from the controller 7 to the station monitoring unit 9 through the interface portion 8. The station monitoring unit 9 transmits that information to a maintenance person of the network so that the maintenance person may select the systems in the optical service unit, the optical transmission line, and the optical network unit with that information upon the faults.

FIG. 2 illustrates a switching operation by the controllers 7, 27 of the receiving systems in the optical service unit and the optical network units. This figure shows an example of only one of the optical receiving systems of plural network units for the convenience's sake.

(1) In the normal operation, both of the optical service unit and the optical network units select the wavelengths of 1.3 μm (system0) for the active condition and 1.5 μm (system1) for the standby condition. The both of the system0 and system1 in the optical service unit and the optical network units transmit the same contents.

(2) When the optical transmission portion, i.e. the transmitting system composed of the coupler 21, the optical photoelectric converter 22, the multiplexing/demultiplexing portion 24, and the system changer 26, of the system0 of the respective optical network units has a fault and the optical signal of the subscriber to the optical service unit is interrupted, the main signal of only the optical service unit is switched over to the system1. The receiving systems of the optical network units work normally, so that the controller 27 does not switch over the receiving system.

(3) When the reception portion, i.e. the receiving system composed of the coupler 21, the optical photoelectric converter 22, the multiplexing/demultiplexing portion 24, and the system changer 26 of the system0 of the respective network units has a fault and can not normally receive the down signal of the system0 from the optical service unit, the optical service unit switches over the main receiving signal to the system1. In the absence of the down signal of the system0 from the optical service unit for determining the transmission timing of the up signal of the system0, the optical network unit cannot provide the up signal of the system0 so that the controller 7 of the optical service unit recognizes the situation and switches over the system0 to the system1.

(4) When a fault occurs in the transmission-reception portions of the optical network units, the optical service unit and the optical network units select the system1 for the reception.

(5) When a fault occurs in the optical transmission portion of the system0 of the optical service unit, the system1 is selected for the reception portion of the optical network units and in turn the optical service unit because the optical network units can make the transmission only by the system0.

(6) When a fault occurs in the reception portion of the optical service unit, only the optical service unit select the system1 and the optical network units do not switch over the system because the reception portions of the optical network units work normally.

(7) When a fault occurs in the transmission-reception portion of the system0 of the optical service unit, the reception portions of the optical service unit and the optical network units both select the system1.

Thus, only when a fault occurs either in the transmission potion of the system0 of the optical network units or the reception portion of the optical service unit, the optical network units can still select the system0.

Figure 3:
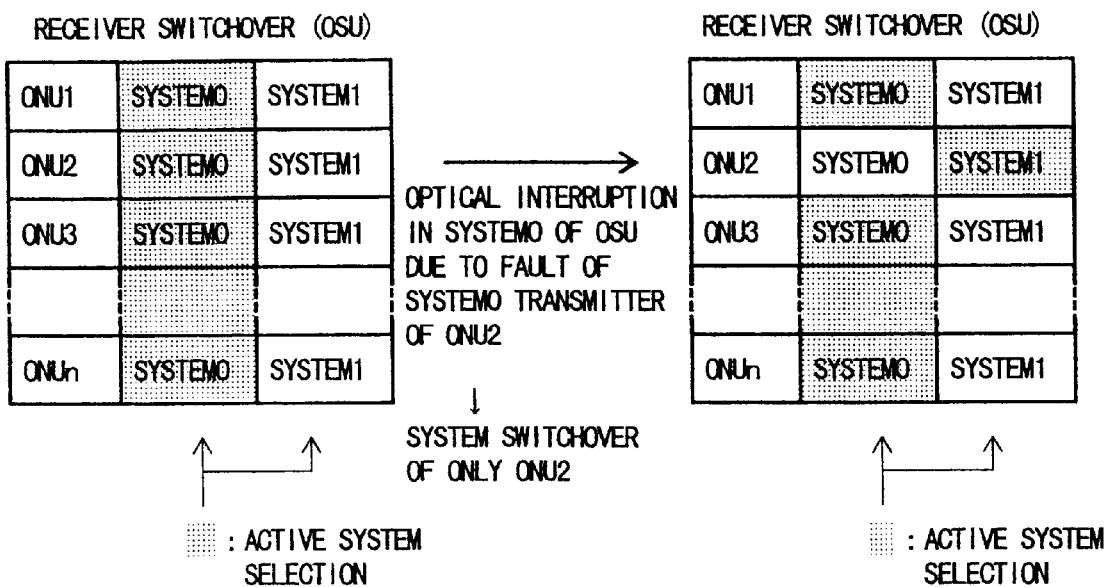
FIG. 3 is a chart showing a switchover example of the receiving system of an optical service unit and an optical network unit (for each subscriber) in the embodiment (1) of the optical subscriber network system according to the present invention.

FIG. 3 illustrates an example of system switchover in each of the optical network units, where a switchover in the optical service unit is made per each of the optical network units according to the state of the up signal from the optical network units. In this figure the optical service unit switches over only the optical network unit ONU2 from the system0 to the system1 since a fault occurs in the transmission portion of the network unit ONU2 so that the input of the system0 in the optical service unit is interrupted. The system switchingover is not performed for the network units which have no trouble in the state of transmission.

FIG. 4 shows an example of signal frame format used in the transmission line between the optical service unit and the optical network units. As shown in FIG. 4A, the up signal frame includes a subscriber overhead (SUB•OH), in addition to the main signal data, in which the information regarding the reception states of the down optical signals of the system0 and system1 in the own unit, and the system switchover information for the reception is transmitted. In the optical service unit, a fault of the optical network units can be detected by the overhead of the up signal.

As shown in FIG. 4B, the information regarding the reception state of the optical signal with respect to the optical network units in the optical service unit and the system switchover is also transmitted by the down signal frame from the optical service unit to the optical network units. In the optical network units, the state of each system in the up signal frame from the own station can be detected by the overhead (SUB•OH) of the down signal frame from the optical service unit.

These up and down signal formats can serve to detect faults in the opposite units, whereas the switchover of the receiving system can be done when the controller of the own unit monitors the reception state.

Figure 5:
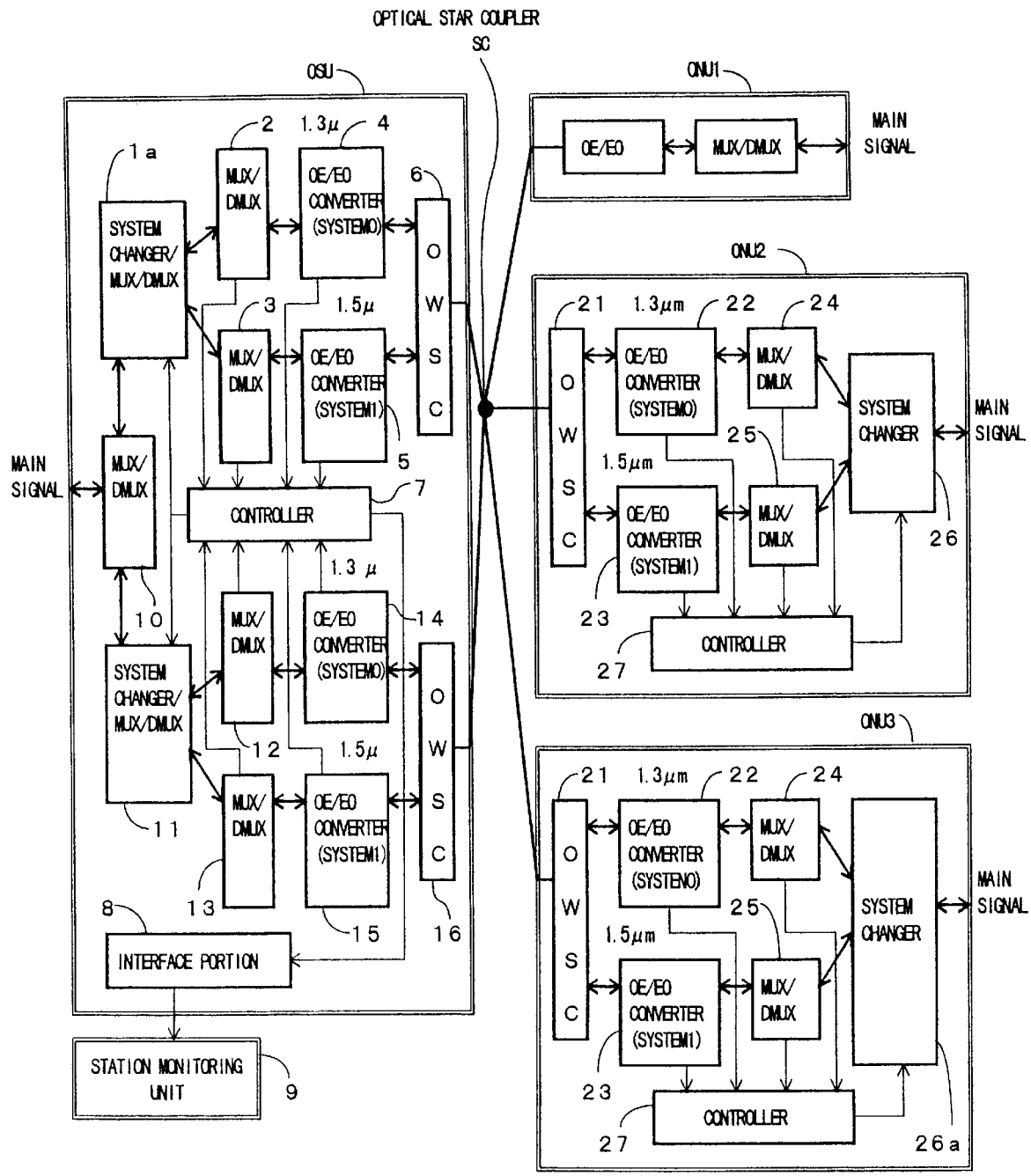
FIG. 5 is a block diagram showing an embodiment (2) of the optical subscriber network system according to the present invention.

FIG. 5 shows an embodiment (2) of the optical subscriber network system according to the present invention. In this embodiment, a redundant arrangement for the transmission system between the optical service unit and the optical network units can be flexibly made by subscribers' demands.

Namely, in the optical service unit OSU, the multiplexing/demultiplexing portions 2, 3, the photoelectric converters 4, 5, the optical wavelength selecting coupler 6, and the controller 7, which are all shown in FIG. 1, are used in the same connection. Instead of the system changer 1, a system switchover/multiplexing/demultiplexing portion 1a is used.

In addition to the redundant arrangement, another redundant one is provided which is formed of a system changer/multiplexing/demultiplexing portion 11, multiplexing/demultiplexing portions 12, 13, the photoelectric converters 14, 15, and the optical wavelength selecting coupler 16.

The system changer/multiplexing/demultiplexing portions 1a and 11 input and output the main signal through the multiplexing/demultiplexing portion 10. The multiplexing/demultiplexing portion 10 serves to synchronize system changers for the receiving systems in the system changer/multiplexing/demultiplexing portions 1a and 11 with the system0/system1 by a subscriber's selection, output the signal from the optical network units, and divide the signal to the optical network units into the system0 and system1. The optical wavelength selecting couplers 6, 16 are connected to the optical star coupler SC.

This optical service unit is arranged to be able to select and connect the following three types of optical network units ONU1, ONU2 and ONU3 depending on how the subscribers desire to remove faults in the transmission line. As shown in FIG. 6, the optical network unit ONU1 has no redundancy arrangement between the optical star coupler SC and the optical network units. The optical network unit ONU2 has a duplexed pseudo arrangement between the optical service unit and the optical network units with the optical wavelength multiplexing method like the embodiment (1). The optical network unit ONU3 can select either a duplexed arrangement between the optical service unit and the optical network units or a doubled arrangement of the transmission capacity therebetween.

The optical service unit has a duplexed arrangement for each wavelength in addition to the redundancy of the system0 and system1 formed by wavelength division multiplexing (WDM) as shown in the above embodiment (1), thereby dealing with the optical network units without redundancy. This is because the optical network units without redundancy require the down signal for the timing of the up signal as described above.

Namely as shown in FIG. 6, the optical network unit ONU3 can select two types of arrangements. One utilizes the communication path of the WDM system0 and system1 between the optical service unit and the optical network units as a redundant arrangement for more important communications. The other provides a transmission capacity twice as much as the redundant arrangement for communications which do not make much of faults. The latter arrangement has a single line bundled with the main signal data in the optical signals in the duplexed systems for the wavelengths of 1.3 μm and 1.5 μm. Also, the latter arrangement reduces the line capacity to protect the line from the communication state with the system0 or system1 under the control of the controller 27.

FIG. 7 shows types, operating modes, and active receiving systems of the optical network unit where the optical network units are provided by the number of "n" which is more than "3" in the embodiment shown in FIG. 6. For example, the optical network units ONU1–ONU3 are the same as those shown in FIG. 6, and the optical network unit ONU4 selects "enhanced line capacity (speed)" among the redundant system and enhanced line capacity as the operating mode. The optical network unit ONUn is "with redundancy" and its active receiving system is set to "system0".

The information as to those subscribers is stored in the controller 7. Based on this information, the controller 7 carries out the operating mode of each network unit by automatically switching over the system changer/multiplexing/demultiplexing portions 1a, 11 at the time slot allotted to each optical network unit by the TDMA method.

Referring to the embodiment in FIG. 5, at the time slot allotted to the optical network system ONU2, the controller 7 selects the system changer/multiplexing/demultiplexing portion 1a, but not the system changer/multiplexing/demultiplexing portion 11.

Thus, the multiplexing/demultiplexing portion 10, the system changer/multiplexing/demultiplexing portion 1a, the multiplexing/demultiplexing portions 2, 3, the photoelectric converters 4, 5, and the optical wavelength selecting coupler 6 cooperate with the optical network unit ONU2 as the redundant mode.

At the time slot allotted to the optical network unit ONU3, the controller 7 selects the system changer/multiplexing/demultiplexing portion 11, but not the system changer/multiplexing/demultiplexing portion 1a.

Therefore the multiplexing/demultiplexing portion 10, the system changer/multiplexing/demultiplexing portion 11, the multiplexing/demultiplexing portions 12, 13, the photoelectric converters 14, 15, and the optical wavelength selecting coupler 16 cooperate with the optical network unit ONU3 in the enhanced line capacity mode.

Figure 8:
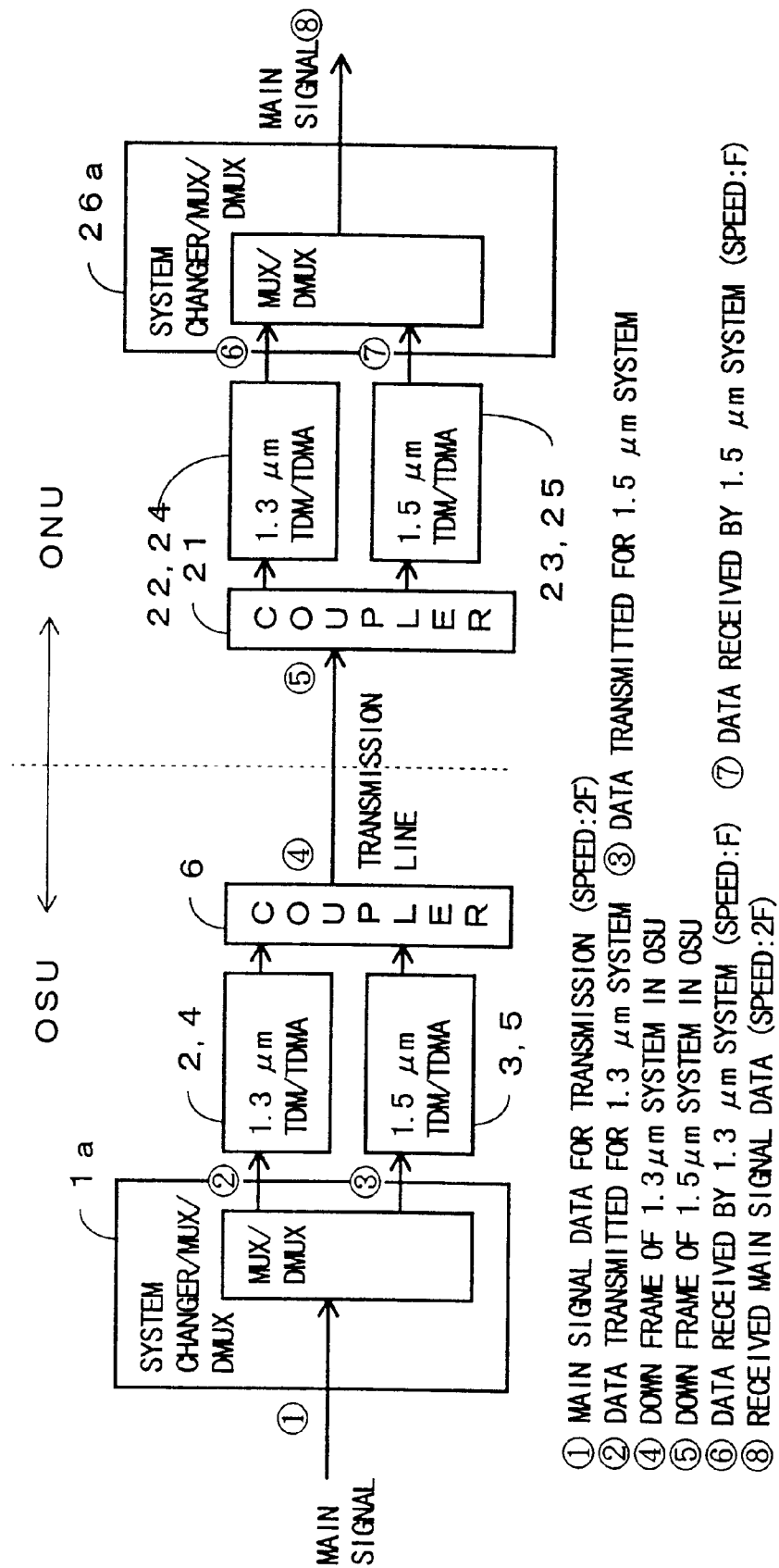
FIG. 8 is a diagram showing the flow of a down signal when an enhanced line capacity mode is selected in the embodiment (2) of the optical subscriber network system according to the present invention.
Figure 9:
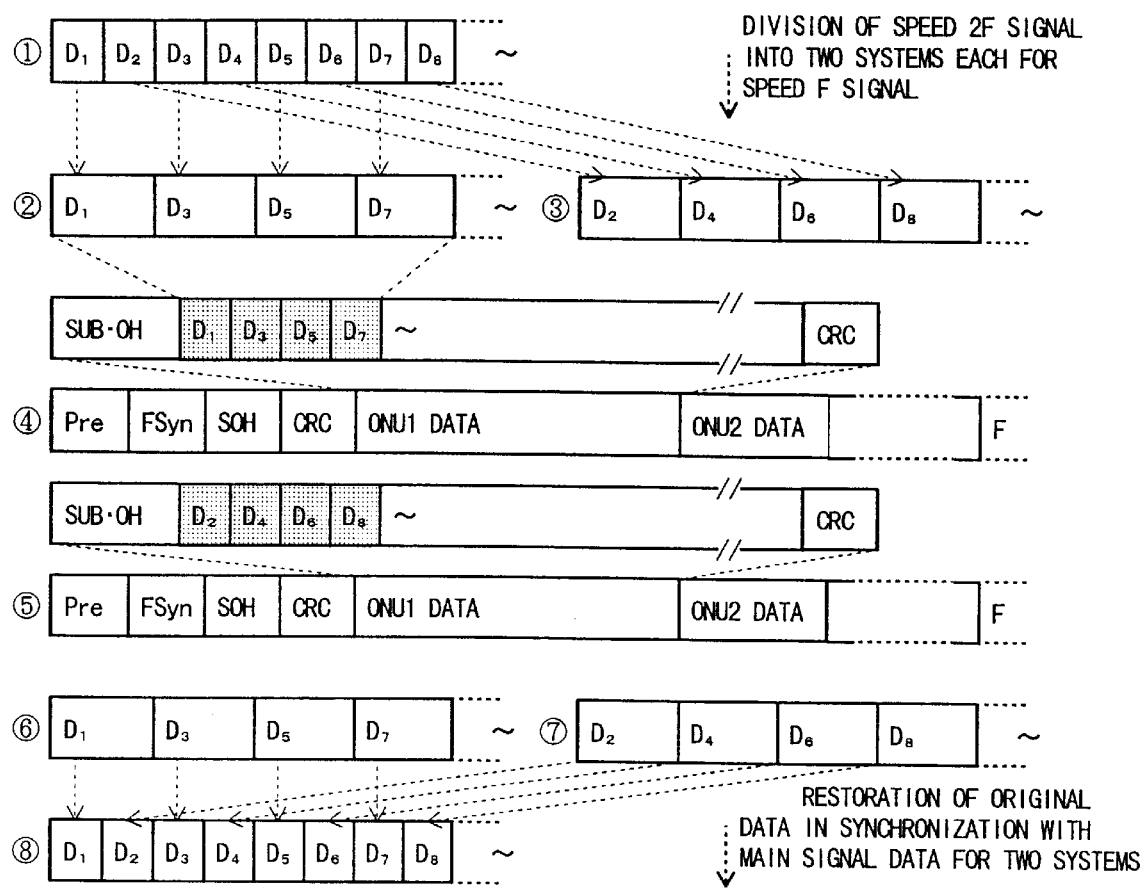
FIG. 9 is a time chart of the down signal when the enhanced line capacity mode is selected in the embodiment (2) of the optical subscriber network system according to the present invention.

FIG. 8 shows a flow of the down signal in the enhanced line capacity mode selected, the time chart of which is shown in FIG. 9.

In the optical service unit, it is supposed that the speed (rate) of the main signal ① supplied from the multiplexing/demultiplexing portion 10 (not shown) to the system changer/multiplexing/demultiplexing portion 1a be "2F". A signal ② sent to the multiplexing/demultiplexing portion 2 and the photoelectric converter 4 and a signal ③ sent to the multiplexing/demultiplexing portion 3 and the photoelectric converter 5 become the speed of "F".

These signals ②, ③ are coupled by the coupler 6 and sent to the transmission line as the signals ④, ⑤ respectively, however become the speed of "2F" because they are subjected to WDM.

On the side of the optical network units, those signals are coupled by the coupler 21 to have a signal ⑥ with the speed of "F" through the photoelectric converter 22 and the multiplexing/demultiplexing portion 24, and to have a signal ⑦ with the rate of "F" through the photoelectric converters 23 and the multiplexing/demultiplexing portion 25. These signals ⑥, ⑦ are multiplexed at the multiplexing/demultiplexing portion 26a to have the main signal ⑧ with the speed of "2F".

It is accordingly seen that in the embodiment (1) of the FIG. 1 the speed of the main signal ⑧ is "F" because either the signal ⑥ or ⑦ is selected by using the system changer 26, not the system changer/multiplexing/demultiplexing portion 26a while in the embodiment (2) the speed of the main signal is "2F" and the line speed is enhanced.

Figure 10:
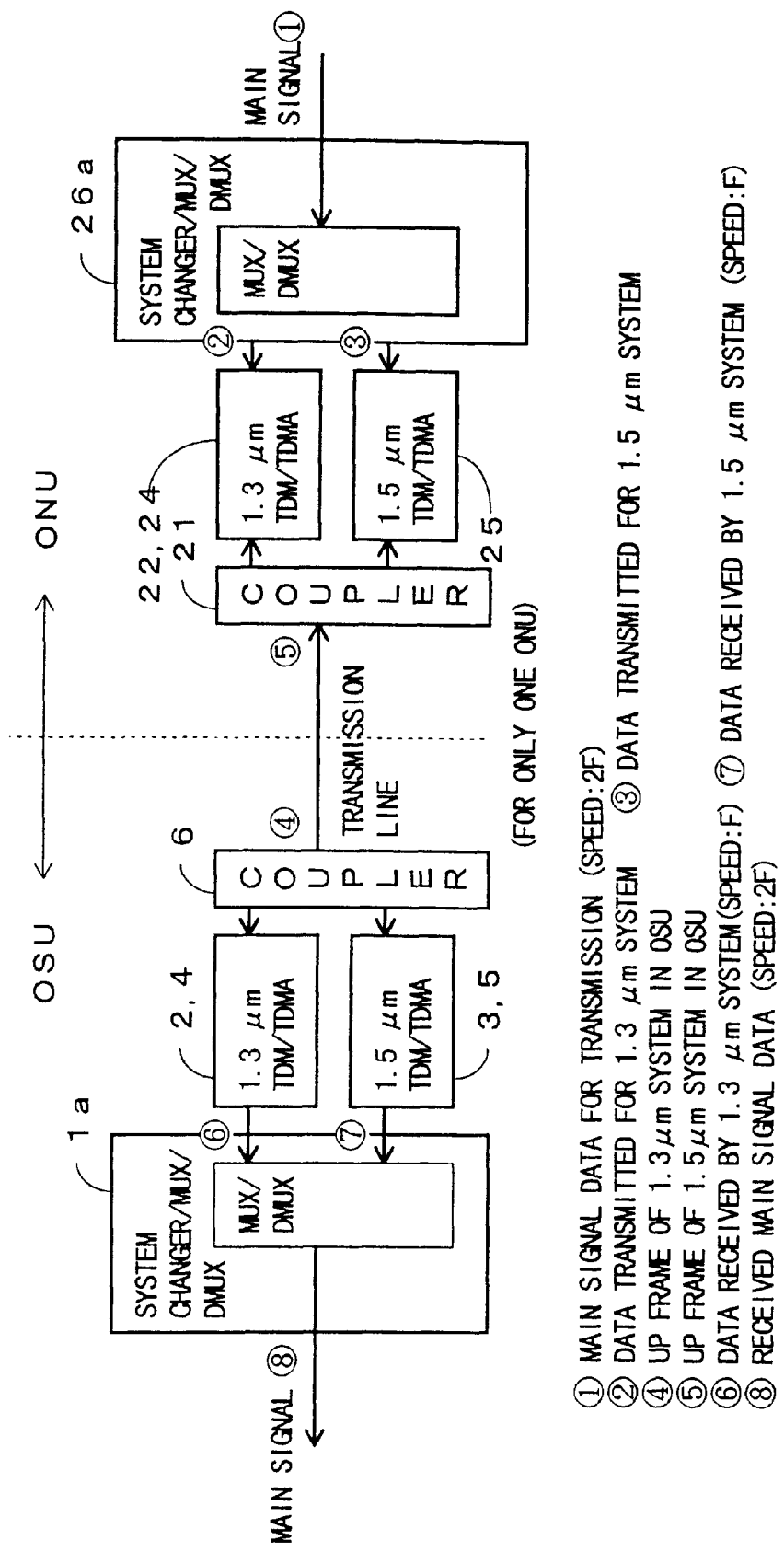
FIG. 10 is a diagram showing the flow of an up signal when the enhanced line capacity mode is selected in the embodiment (2) of the optical subscriber network system according to the present invention.
Figure 11:
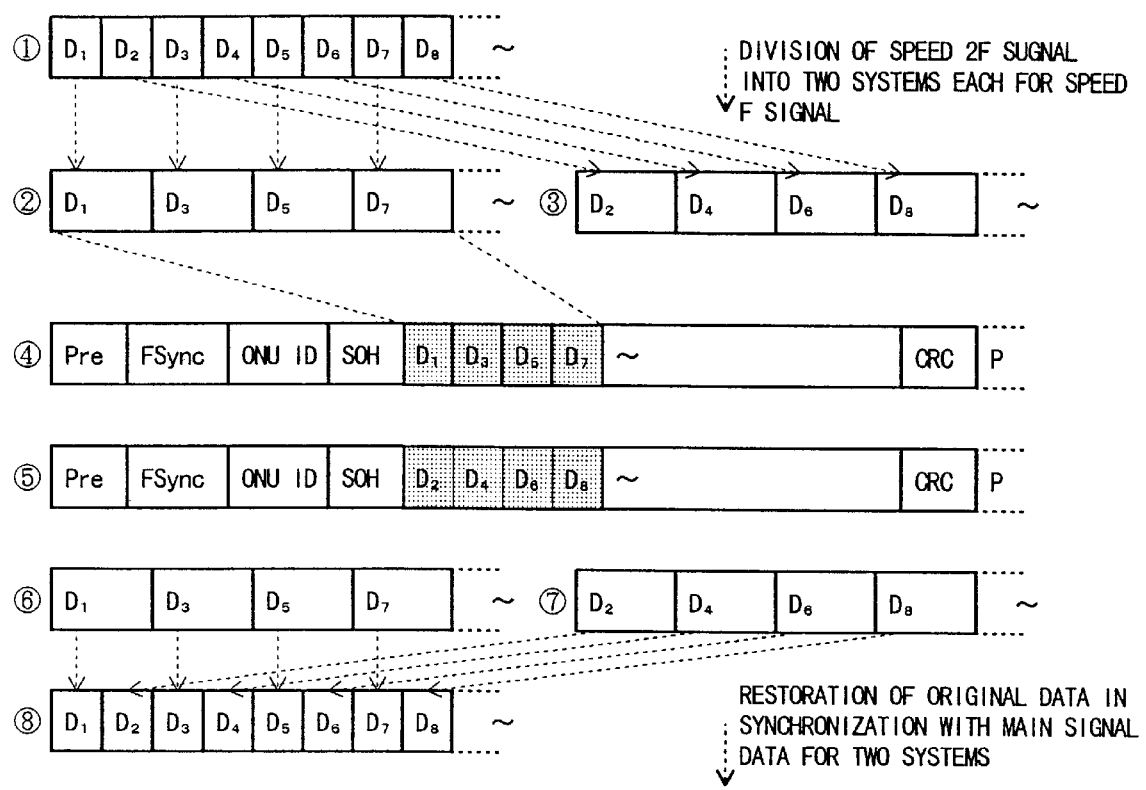
FIG. 11 is a time chart of the up signal when the enhanced line capacity mode is selected in the embodiment (2) of the optical subscriber network system according to the present invention.
Figure 12:
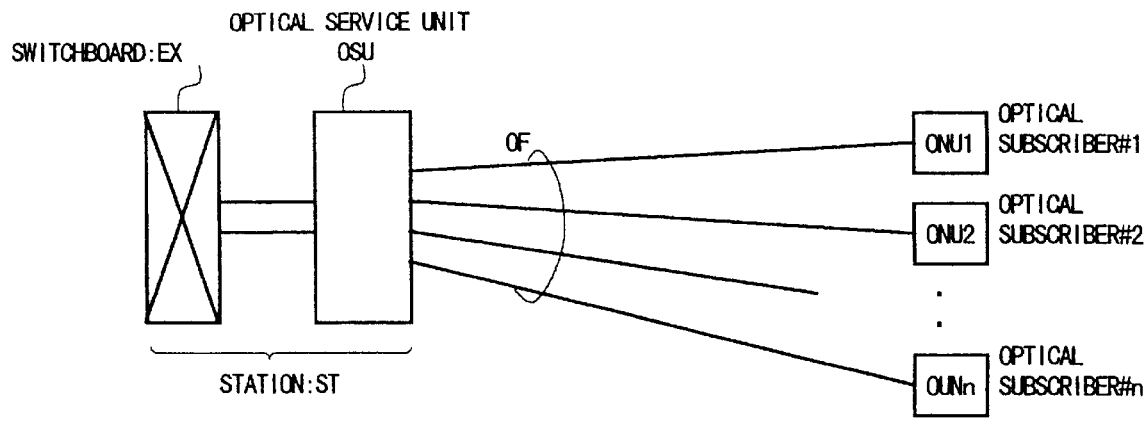
FIG. 12 is a block diagram showing an arrangement of the prior art optical subscriber network system.
Figure 13:
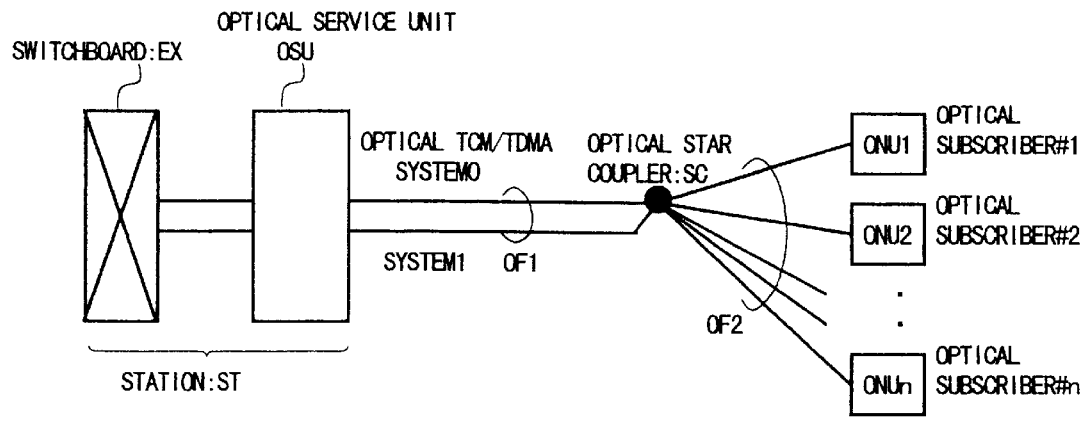
FIG. 13 is a block diagram showing an arrangement of the prior art passive optical subscriber network system.
Figure 14:
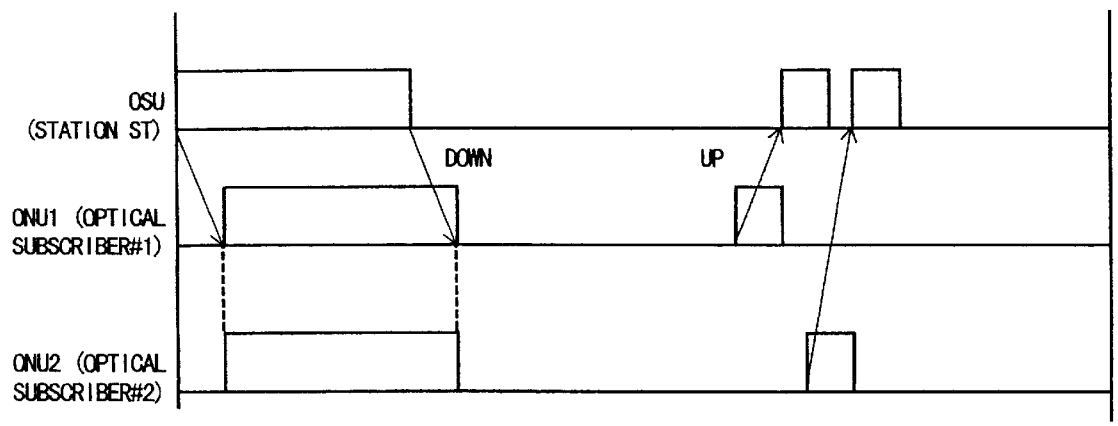
FIG. 14 is a time chart of a general TDM/TDMA frame.
Figure 15:
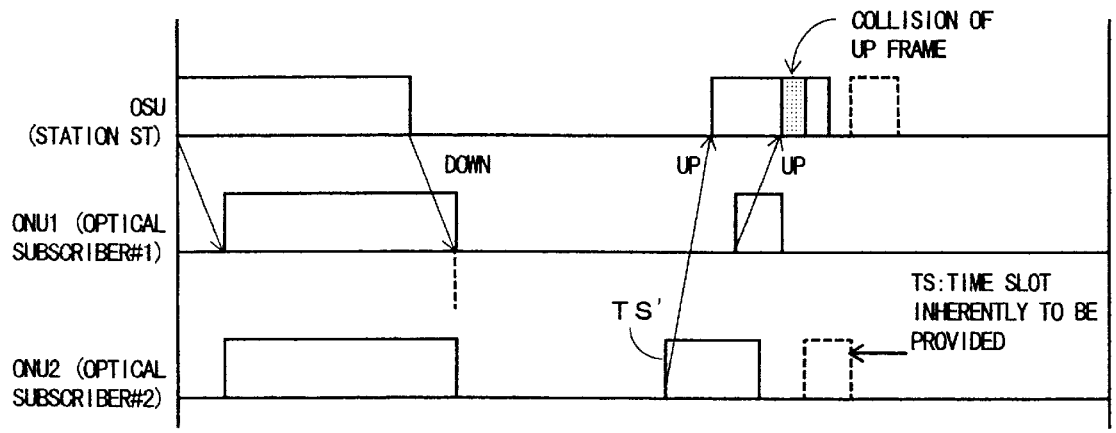
FIG. 15 is a time chart illustrating a faulted state of the prior art optical network unit.
Figure 16:
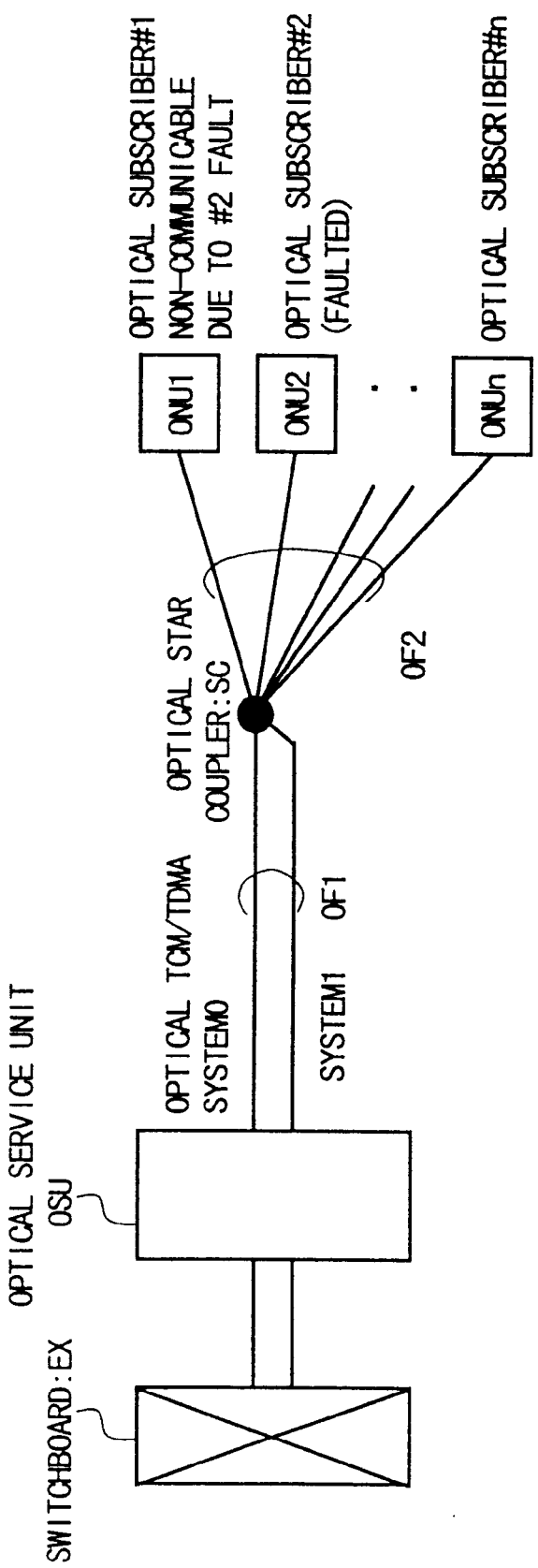
FIG. 16 is a diagram illustrating a faulted state of the prior art optical network unit.
Figure 17:
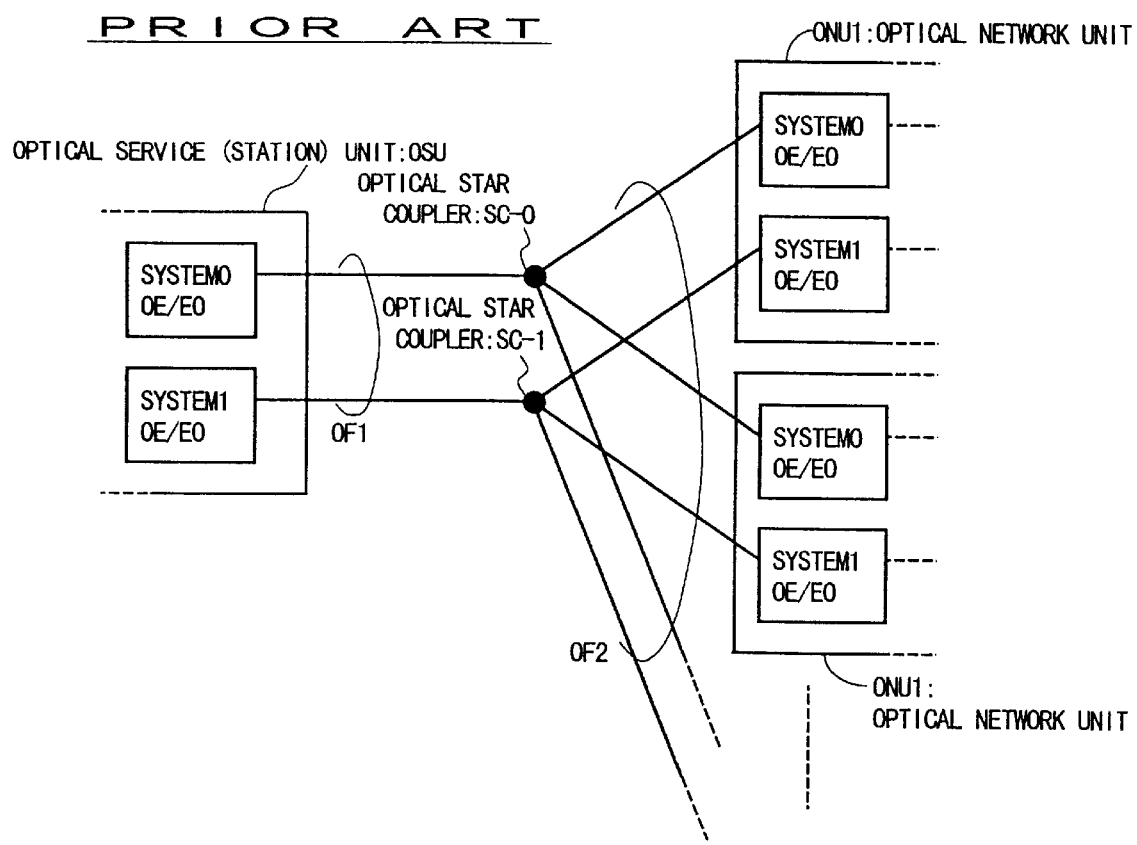
FIG. 17 is a block diagram showing a duplexed subscriber transmission system of the prior art.

FIG. 10 shows a flow of the up signal in the selected operating mode of "enhanced line capacity" the time chart of which is shown in FIG. 11.

As having been shown in FIG. 5, the optical service unit OSU and the optical network unit ONU3 have arrangements opposite to each other, so that in FIGS. 8 and 9 only the signal directions are opposite to each other but the operations of other parts are the same.

As described above, the optical subscriber network system according to the present invention is arranged so that the optical service unit and the optical network units are provided with transmission-reception portions of more than two systems whose wavelengths are different from each other, and the inputs and outputs of the plural transmission-reception portions are multiplexed with the wavelengths into a single optical transmission line to form a pseudo redundant communication path between the optical service unit and the optical network units. The communication using one wavelength between the optical service unit and the optical network units is for an active system and the communication using the other wavelength is for a standby system. If the communication of the active system is faulted, the active system is switched over to the standby system. Therefore, it is possible to duplex the optical transmission system with a lower cost, thereby reducing the influence of the fault of the optical transmission-reception portion between the optical service unit and the optical network units on the line.

Also, if an obstacle to other subscriber's communication occurs due to an abnormal light emission at the transmission portion of the network units, it is possible to preclude the worst case where the communication with all subscribers is interrupted. In addition, even when an obstacle occurs on one system of the network units, it is also possible to check the physical transmission line between the optical service unit and the optical network units by the communication with the wavelength for the other system, thereby easily specifying the faulted point.

Furthermore, the communication path between the optical service unit and the optical network units using plural optical wavelengths makes it possible to select one of a system with redundancy, a system without redundancy, and a system with enhanced line capacity according to the subscribers' demands, resulting in a flexible subscriber network.

What we claim is:

1. An optical subscriber network system connecting plural optical network units to an optical service unit using an optical star coupler through an optical transmission line, the optical service unit and the optical network units each comprising;
   plural systems of transmission-reception portions which transmit and receive signals the wavelengths of which differ from one system to another,
   an optical coupler installed between the transmission-reception portions and the optical transmission line,
   a system changer which switches over the transmission-reception portions and receives a main signal of one system, and
   a controller which monitors the reception state detected at the transmission-reception portions, and switches over the system changer to the system without a fault which the controller detects from the reception state.

2. The optical subscriber network system as claimed in claim 1 wherein the system changer separates the main signal into each of the transmission-reception portions.

3. The optical subscriber network system as claimed in claim 2 wherein the controller drops or adds a frame signal which has a subscriber overhead indicating the reception state, from the transmission-reception portions.

4. The optical subscriber network system as claimed in claim 1 wherein the controller drops or adds a frame signal which has a subscriber overhead indicating the reception state, from the transmission-reception portions.

5. The optical subscriber network system as claimed in claim 1 wherein each transmission-reception portion is composed of a multiplexing/demultiplexing portion which multiplexes/demultiplexes an electrical signal, and a photoelectric converter connected to the multiplexing/demultiplexing portion to make conversions between an optical signal and an electric signal.

6. The optical subscriber network system as claimed in claim 1 wherein the optical coupler comprises an optical wavelength selecting coupler which synthesizes a transmission signal of the transmission-reception portion and separates a reception signal from the optical transmission line to both of the transmission-reception portions.

7. An optical subscriber network system connecting plural optical network units to an optical service unit using an optical star coupler through an optical transmission line, the optical service unit and the optical network units each comprising plural combinations of;
   plural systems of transmission-reception portions which transmit and receive signals the wavelengths of which differ from one system to another,
   an optical coupler installed between the transmission-reception portions and the optical transmission line, and
   a system changer/multiplexing/demultiplexing portion which switches over the transmission-reception portions and receives a main signal of one system,
   the optical subscriber network system further comprising;
   a multiplexing/demultiplexing portion connected to the system changer/multiplexing/demultiplexing portions to output the main signal, and
   a controller which monitors the reception state detected at the transmission-reception portions, and switches over the system changer/multiplexing/demultiplexing portion to a system without faults which the controller detects from the reception state,
   the controller controlling the system changer/multiplexing/demultiplexing portion to form either a system with redundancy or a system with enhanced line speed, and each optical network unit being adapted to select any of the system without redundancy, or with only redundancy, or with redundancy and enhanced line speed.

8. The optical subscriber network system as claimed in claim 7 wherein the system changer/multiplexing/demultiplexing portion separates the main signal into each of the transmission-reception portions.

9. The optical subscriber network system as claimed in claim 8 wherein the controller drops or adds a frame signal with a subscriber overhead indicating the reception state from the transmission-reception portion, and has a time slot information allotted to each optical network unit for controlling the system changer/multiplexing/demultiplexing portion on the basis of the arrangement of each optical network unit.

10. The optical subscriber network system as claimed in claim 7 wherein the controller drops or adds a frame signal with a subscriber overhead indicating the reception state from the transmission-reception portion, and has a time slot information allotted to each optical network unit for controlling the system changer/multiplexing/demultiplexing portion on the basis of the arrangement of each optical network unit.

11. The optical subscriber network system as claimed in claim 7 wherein each transmission-reception portion is composed of a multiplexing/demultiplexing portion which multiplexes/demultiplexes an electrical signal, and a photoelectric converter connected to the multiplexing/demultiplexing portion to make conversions between an optical signal and an electric signal.

12. The optical subscriber network system as claimed in claim 7 wherein the optical coupler comprises an optical wavelength selecting coupler which synthesizes a transmission signal of the transmission-reception portion and separates a reception signal from the optical transmission line to both of the transmission-reception portions.

* * * * *